(12) United States Patent
Kim et al.

(10) Patent No.: US 10,899,359 B2
(45) Date of Patent: Jan. 26, 2021

(54) VEHICLE AND METHOD FOR PROTECTING PERSON LEFT IN VEHICLE

(71) Applicants: Hyundai Motor Company, Seoul (KR); Kia Motors Corporation, Seoul (KR)

(72) Inventors: Gyun Ha Kim, Incheon (KR); Dae Yun An, Gyeonggi-do (KR); Eung Hwan Kim, Seoul (KR); Eun Young Choi, Seoul (KR); Seul Ki Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/666,704

(22) Filed: Oct. 29, 2019

(65) Prior Publication Data
US 2020/0353940 A1    Nov. 12, 2020

(30) Foreign Application Priority Data
May 10, 2019    (KR) .................. 10-2019-0055045

(51) Int. Cl.
*H04Q 1/08* (2006.01)
*B60W 50/00* (2006.01)
*G01S 13/88* (2006.01)
*B60N 2/00* (2006.01)
*B60H 1/00* (2006.01)

(52) U.S. Cl.
CPC ..... *B60W 50/0098* (2013.01); *B60H 1/00742* (2013.01); *B60N 2/002* (2013.01); *G01S 13/886* (2013.01)

(58) Field of Classification Search
None
See application file for complete search history.

(56) References Cited

U.S. PATENT DOCUMENTS

| 6,922,622 | B2 | 7/2005 | Dulin et al. |
| 9,403,501 | B2 | 8/2016 | Teng et al. |
| 9,847,004 | B1 * | 12/2017 | Lan .......... G08B 21/24 |
| 10,438,479 | B1 * | 10/2019 | Guidotti .......... B60Q 1/50 |

(Continued)

FOREIGN PATENT DOCUMENTS

| EP | 3 461 664 A1 | 4/2019 |
| JP | 2017-181225 A | 10/2017 |
| KR | 10-1870916 B1 | 7/2018 |

OTHER PUBLICATIONS

J. Physiol. (1949) 109, 459-474, the Respiratory Rate and Ventilation in the Newborn Baby, K.W. Cross, the Physiology Department, St. Mary's Hospital Medical School, Paddington, W.2.

*Primary Examiner* — Brent Swarthout
(74) *Attorney, Agent, or Firm* — Mintz Levin Cohn Ferris Glovsky and Popeo, P.C.; Peter F. Corless

(57) ABSTRACT

A method for protecting a person left in a vehicle includes determining whether the person present on a rear seat is an infant, by using a waveform of a reflected wave generated by a radar sensor after an ignition of the vehicle is turned off, determining a risk level when the person on the rear seat is determined to be the infant, and taking a first step measure that corresponds to a risk factor, when the risk level indicates a possibility of danger to the person.

19 Claims, 9 Drawing Sheets

(56) References Cited

U.S. PATENT DOCUMENTS

| | | | |
|---|---|---|---|
| 2011/0121996 A1* | 5/2011 | Griffin | G01S 15/526 340/943 |
| 2013/0201013 A1* | 8/2013 | Schoenberg | B60N 2/2869 340/438 |
| 2016/0176265 A1* | 6/2016 | Rolka | B60N 2/002 701/45 |
| 2018/0029591 A1 | 2/2018 | Lavoie | |
| 2018/0050575 A1* | 2/2018 | Campbell | B60R 21/01536 |
| 2018/0170213 A1* | 6/2018 | Lu-Dac | B60N 2/26 |
| 2020/0050874 A1* | 2/2020 | Lorenz | G08B 21/22 |
| 2020/0062080 A1* | 2/2020 | Hernandez | B60N 2/002 |

* cited by examiner

|  | ADULT | INFANT |
|---|---|---|
| AVERAGE RESPIRATION RATE (RESPIRATION PER MINUTE) | 12~20 | 18~41.9 |

FIG.6

| RISK FACTOR | DETECTION SENSOR | COUNTERMEASURE | SYSTEM TO TAKE COUNTERMEASURE |
|---|---|---|---|
| WEATHER (SUNSHINE, SULTRINESS, COLD) | TMS | CLOSE WINDOWS / MAINTAIN APPROPRIATE INDOOR TEMPERATURE | POWER WINDOW / AIR-CONDITIONING (WIND STRENGTH, TEMPERATURE) |
| TEMPERATURE INCREASE | TEMPERATURE SENSOR | MAINTAIN APPROPRIATE INDOOR TEMPERATURE | POWER WINDOW / AIR-CONDITIONING (WIND STRENGTH, TEMPERATURE) |
| $CO_2$ CONCENTRATION INCREASE | $CO_2$ SENSOR | VENTILATE VEHICLE | AIR-CONDITIONING |
| HUMIDITY | HUMIDITY SENSOR | VENTILATE VEHICLE / OPERATE AIR CONDITIONER OR HEATER | AIR-CONDITIONING |

FIG.8

VEHICLE AND METHOD FOR PROTECTING PERSON LEFT IN VEHICLE

CROSS-REFERENCE TO RELATED APPLICATION

This application claims under 35 U.S.C. § 119(a) the benefit of Korean Patent Application No. 10-2019-0055045, filed in the Korean Intellectual Property Office on May 10, 2019, the entire contents of which are incorporated herein by reference.

BACKGROUND

(a) Technical Field

The present disclosure relates to a vehicle and a method for protecting an infant left in the vehicle.

(b) Description of the Related Art

In general, when a person, in particular, an infant is secured on a rear seat of a vehicle (e.g., in a car seat), the driver of the vehicle, after stopping the vehicle, helps the infant to get out of the vehicle and leaves the vicinity of the vehicle together with the infant. However, due to urgent circumstances or carelessness, the driver may leave the vicinity of the vehicle, with the infant left on the rear seat of the vehicle.

After the ignition of the vehicle is turned off, the interior of the vehicle may rapidly reach a state in which a person cannot survive for a long time, depending on an external environment, e.g., due to extreme temperatures. For example, in the summer, the indoor temperature of the vehicle is likely to be much higher than the outdoor temperature. Even when an adult is left alone in the vehicle due to the driver's carelessness, the adult may ask for help by using his/her mobile phone, or may make an attempt to escape outside the vehicle by himself/herself. However, an infant cannot escape outside the vehicle without the driver's help or outside help, and hence there is the potential of a dangerous situation resulting in injury or death to the infant.

SUMMARY

An aspect of the present disclosure provides a vehicle for raising a possibility of survival of a person (e.g., an infant) left in the vehicle and a method for protecting the person left in the vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for protecting a person left in a vehicle includes determining whether the person is present on a rear seat, by using a waveform of a reflected wave generated by a radar sensor after an ignition of the vehicle is turned off, determining a risk level, when it is determined that the person is on the rear seat, and taking a first step measure corresponding to a risk factor, when the risk level indicates a possibility of danger to the person.

According to another aspect of the present disclosure, a method for protecting a person left in a vehicle includes determining whether the person present on a rear seat is an infant, by using a waveform of a reflected wave generated by a radar sensor after an ignition of the vehicle is turned off, determining a risk level, when the person on the rear seat is determined to be the infant, taking a first step measure that corresponds to a risk factor, when the risk level indicates a possibility of danger to the person, determining whether a step shift condition is satisfied during the first step measure, and taking a second step measure, when the step shift condition is satisfied.

According to another aspect of the present disclosure, a vehicle includes a radar sensor that radiates an electromagnetic wave toward a rear seat and measures a change in intensity of a reflected wave that is reflected from the rear seat and a controller that determines whether a person on the rear seat is an infant, by using a waveform of the reflected wave after an ignition of the vehicle is turned off, determines a risk level when the person on the rear seat is determined to be the infant, and takes a first step measure corresponding to a risk factor when the risk level indicates a possibility of danger to the person.

BRIEF DESCRIPTION OF THE DRAWINGS

The above and other objects, features and advantages of the present disclosure will be more apparent from the following detailed description taken in conjunction with the accompanying drawings:

FIG. 6 is a view illustrating an example of distinguishing between an adult and an infant;

FIG. 8 is a table illustrating an example of a first step measure; and

DETAILED DESCRIPTION

Figure 1:
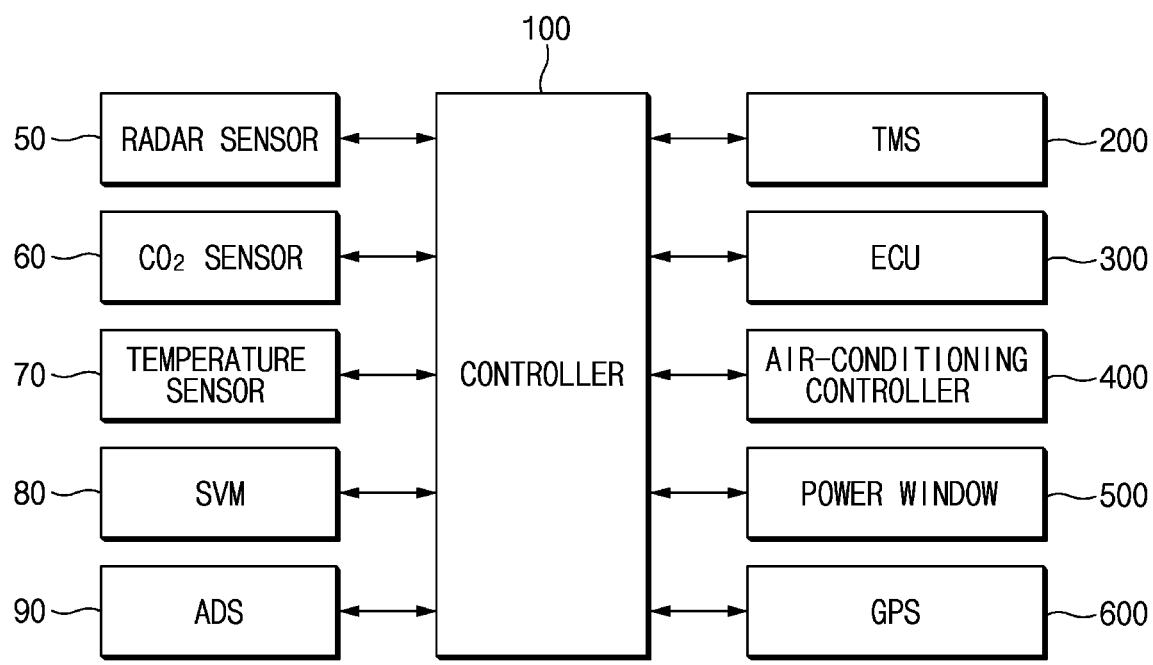
FIG. 1 is a schematic view illustrating a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a schematic view illustrating a vehicle according to an embodiment of the present disclosure.

Referring to FIG. 1, when an infant is left on a rear seat of the vehicle 10 after the ignition is turned off, the vehicle 10 may create an optimal indoor environment that the vehicle 10 can provide to enable the infant left on the rear seat to survive, and the vehicle 10 may actively move the position of the vehicle 10 according to circumstances to inform those outside the vehicle of the dangerous situation in the vehicle 10.

The vehicle 10 may include a radar sensor 50, a $CO_2$ sensor 60, a temperature sensor 70, a surround view monitor (SVM) 80, an automated driving system (ADS) 90, a controller 100, a telematics multimedia system (TMS) 200, an electronic control unit (ECU) 300, an air-conditioning controller 400, a power window 500, and a global positioning system (GPS) 600. The components of the vehicle 10 illustrated in FIG. 1 are illustrative, and at least some of the components may be omitted, or other components may be added, when necessary. Further, the components of the vehicle 10 may be implemented in software or hardware, or in a combination thereof.

The radar sensor 50 is a device for monitoring a state of a person on a rear seat of the vehicle 10. The radar sensor 50 may radiate electromagnetic waves having a specific wavelength (e.g., ultra high frequency waves having a wavelength in the range of 10 cm to 100 cm) toward the rear seat of the vehicle 10, may receive reflected waves reflected from an object located on the rear seat, may measure the waveform of the reflected waves (e.g., a change in the intensity of the reflected waves over time), and may generate reflected-wave information that represents the measured waveform of the reflected waves.

The $CO_2$ sensor 60 may measure the concentration of carbon dioxide contained in indoor air of the vehicle 10 and may generate $CO_2$ information.

The temperature sensor 70 may measure the indoor temperature of the vehicle 10 and may generate temperature information.

According to an embodiment, although not illustrated in FIG. 1, a humidity sensor for measuring the humidity of indoor air may be further included, in addition to the sensor that measures carbon dioxide or temperature.

The SVM 80 may synthesize images of surroundings that are obtained from a plurality of cameras installed on the exterior of the vehicle 10 and may generate a surround view image seen from above the vehicle 10.

The ADS 90 refers to a system that performs or assists with autonomous driving to a destination by using a sensor that is installed on the exterior of the vehicle 10 and that is capable of preventing a collision with an obstacle. The sensor capable of preventing the collision with the obstacle may be a sensor that senses the obstacle, measures the distance from the external object, and generates distance information, and the sensor may be, for example, radar, front/rear cameras, an ultrasonic sensor, or an infrared sensor. However, the scope of the present disclosure is not limited thereto.

The controller 100 may determine whether an occupant on a rear seat is an adult or an infant, based on information collected from the various sensors. When the occupant is determined to be an infant, the controller 100 may discern risk factors and determine whether the current situation is a dangerous situation and may take countermeasures for the respective risk factors. To this end, the controller 100 may have the authority to control the other devices for the purpose of receiving information from the various sensors or performing required operations. Detailed operations of the controller 100 relevant thereto will be described below with reference to FIG. 2 and the following drawings.

The controller 100 may be implemented with a separate ECU independent of the ECU 300, or a processor.

The TMS 200, also called the telematics terminal, may communicate with a telematics center. Specifically, the TMS 200 may receive information such as weather information, map information, and the like from the telematics center and may transmit information such as notification of an emergency situation, a request for help, vehicle state information, and the like to the telematics center.

The ECU 300 is a device that controls the engine, the steering apparatus, and the automatic transmission of the vehicle 10. The ECU 300 may control the ignition, speed, and direction of the vehicle 10.

The air-conditioning controller 400 may be a device that controls on/off, temperatures, and intensities of an air conditioner installed in the vehicle 10 and heating and cooling seats of a front or rear seat.

The power window 500 may control opening/closing of a window of the front or rear seat.

The GPS 600 may generate GPS information by receiving a signal from a GPS satellite and calculating the current position of the vehicle 10.

Although not illustrated in FIG. 1, the vehicle 10 may further include a door sensor (not illustrated) that senses opening/closing of a front or rear door, and the controller 100 may receive, from the door sensor (not illustrated), information about whether the front or rear door is open or closed.

The components of the vehicle 10 illustrated in FIG. 1 may transmit and receive data therebetween through controller area network (CAN) communication for in-vehicle communication. The CAN communication may classify the plurality of components into a plurality of categories. The plurality of components may belong to the same category or different categories.

Figure 2:
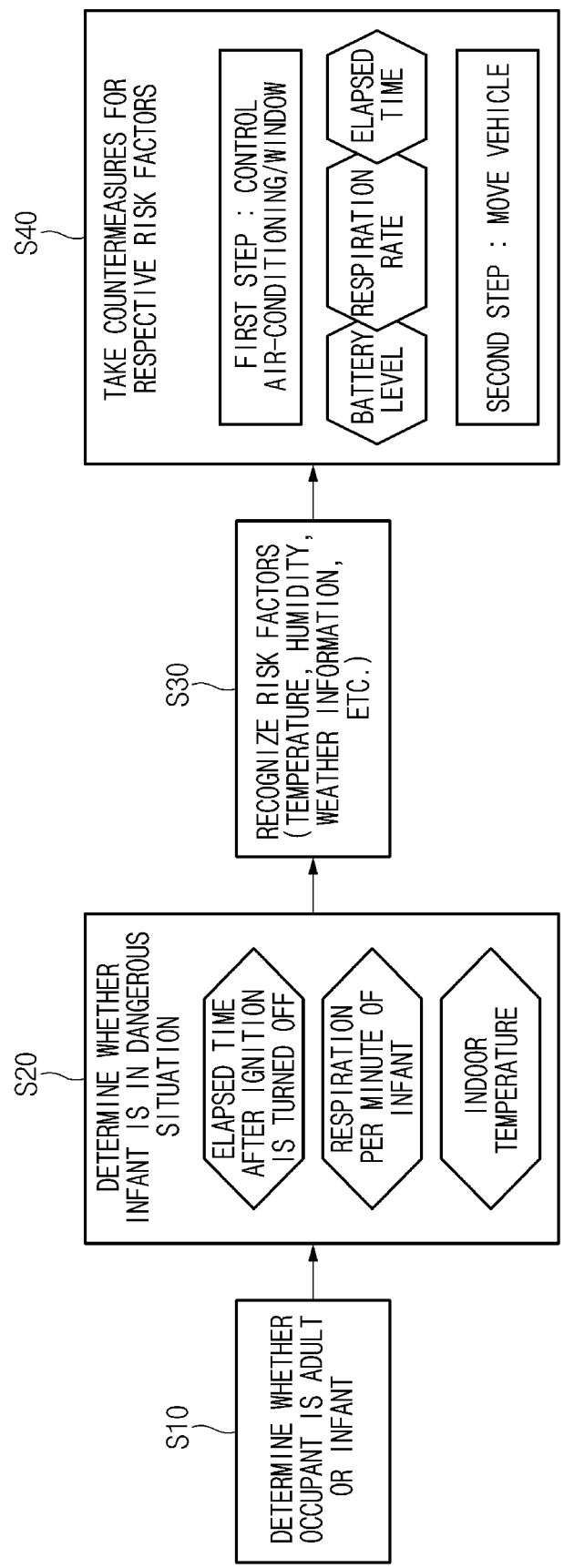
FIG. 2 is a schematic view illustrating an operating method of the vehicle of FIG. 1.

FIG. 2 is a schematic view illustrating an operating method of the vehicle of FIG. 1.

Referring to FIG. 2, the vehicle 10 may determine whether an occupant on a rear seat is an adult or an infant, immediately after the ignition is turned off or within a predetermined period of time (e.g., 30 seconds) (S10).

When the occupant on the rear seat is determined to be an infant, the vehicle 10 may determine whether the infant is in a dangerous situation (S20). At this time, the vehicle 10 may determine whether the infant is in a dangerous situation, based on at least one of the elapsed time after the ignition is turned off, the respiration per minute of the infant, and the indoor temperature.

When the current situation is determined to be a dangerous situation, the vehicle 10 may collect temperature, humidity, weather information, and the like by using the various sensors and may determine what risk factors are present (S30).

The vehicle 10 may take countermeasures for the respective risk factors (S40). The countermeasures may include a first step measure and a second step measure. During the first step measure, the vehicle 10 may determine whether the second step measure is required, based on at least one of the battery level of the vehicle 10, the respiration rate of the infant, and the elapsed time. Correspondingly, the second step measure may be taken in a stepwise manner.

The first step measure may be an operation of controlling the air-conditioning controller 400 and/or the power window 500, and control appropriate for the risk factors may be performed. For example, when the risk factors are high indoor temperature and high outdoor temperature, the vehicle 10 may control the air-conditioning controller 400 to lower and maintain the indoor temperature at an appropriate temperature and may control the power window 500 to close all windows.

The second step measure may be an operation of moving the position of the vehicle 10 to enable other people to recognize the dangerous situation of the vehicle 10. For example, the vehicle 10 may move to a position where the vehicle 10 impedes a movement of another vehicle in a parking lot, thereby enabling a driver of the other vehicle to recognize the dangerous situation of the vehicle 10.

Figure 3:
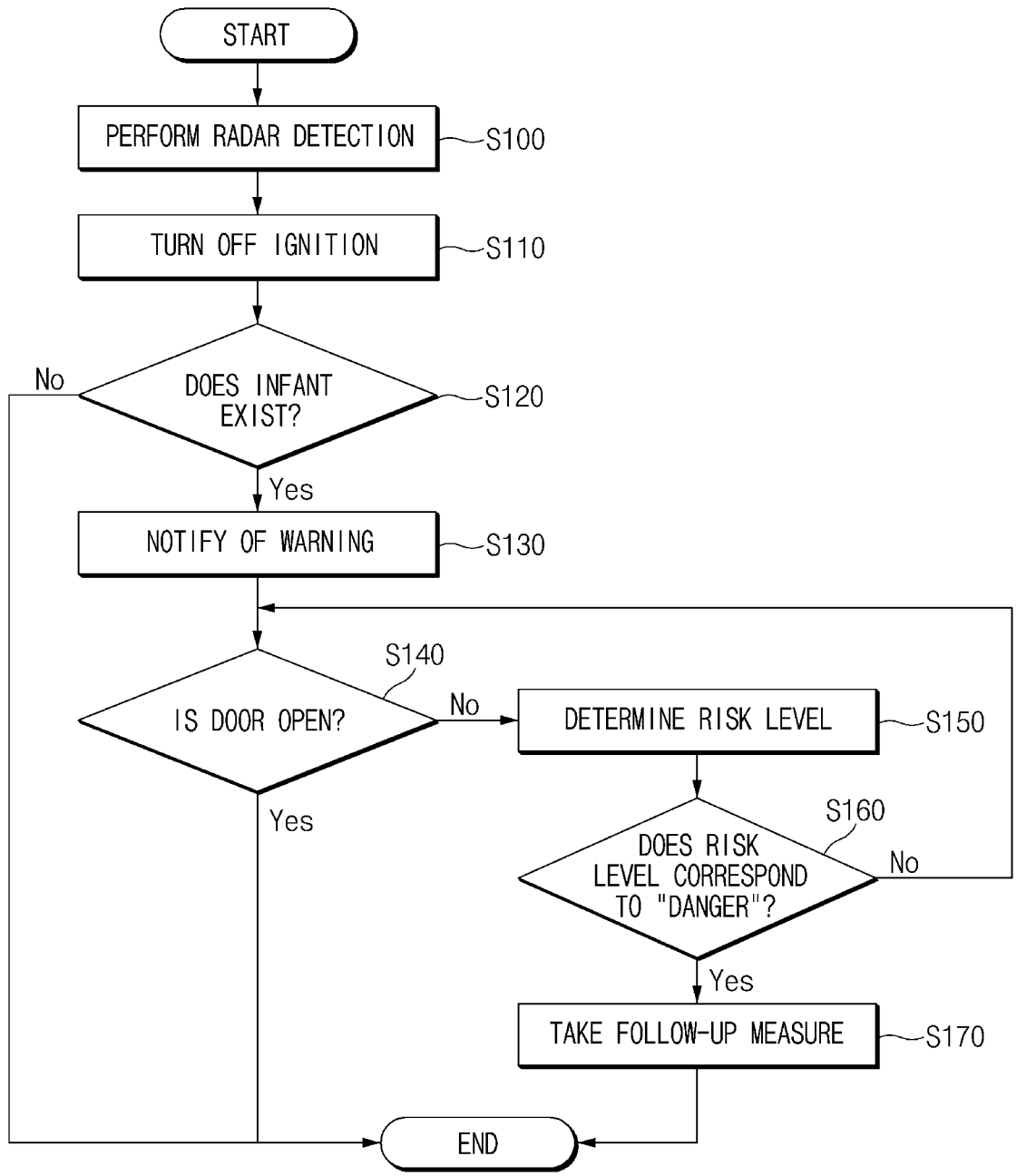
FIG. 3 is a flowchart illustrating a method for protecting a person left in the vehicle according to an embodiment of the present disclosure.
Figure 4:
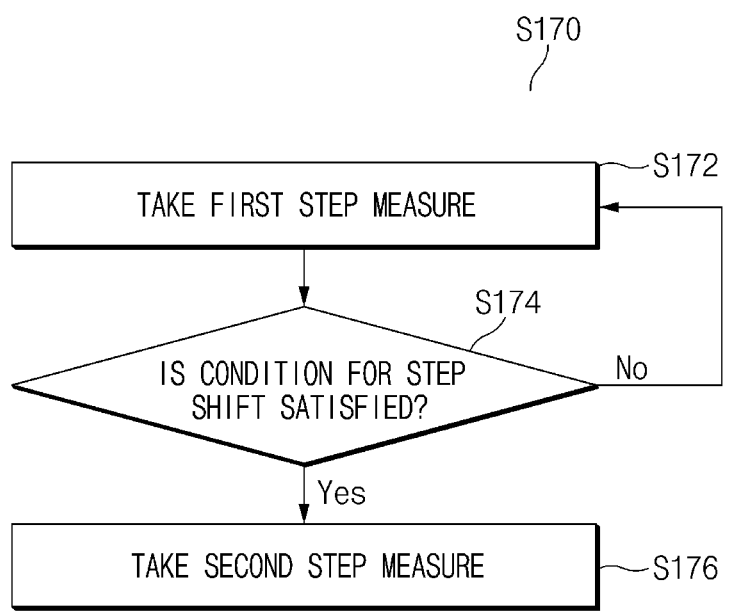
FIG. 4 is a detailed flowchart illustrating step S170 illustrated in FIG. 3.
Figure 5:
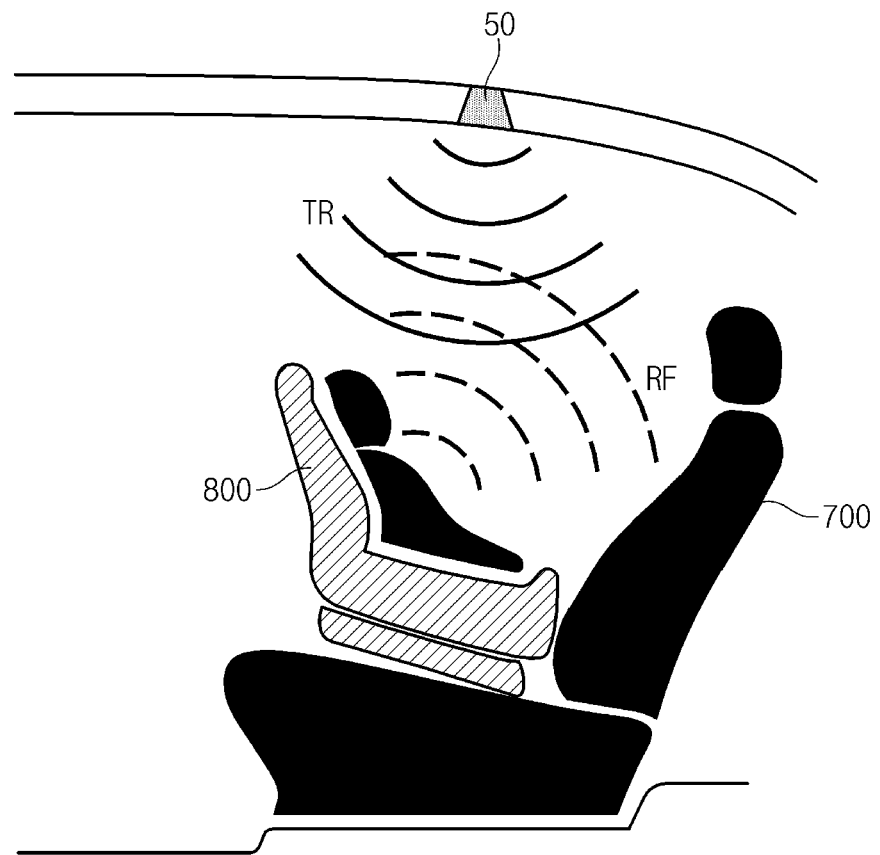
FIG. 5 is a view illustrating an operation of a radar sensor illustrated in FIG. 1.
Figure 7:
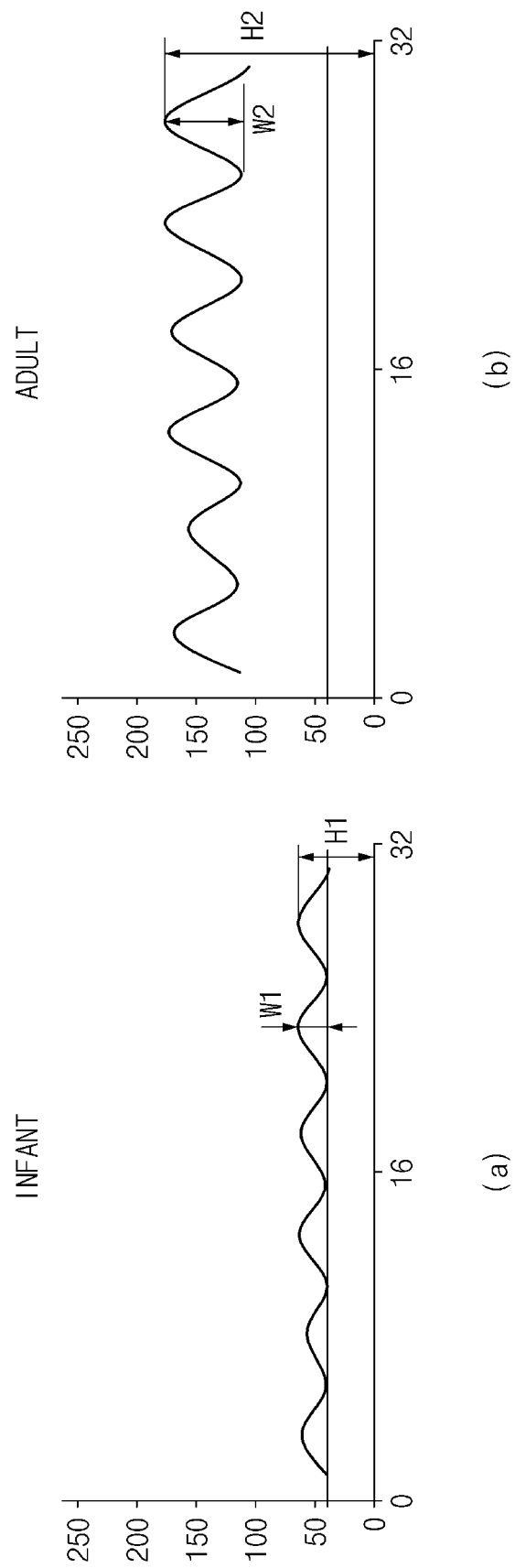
FIG. 7 is a view illustrating another example of distinguishing between an adult and an infant.
Figure 9:
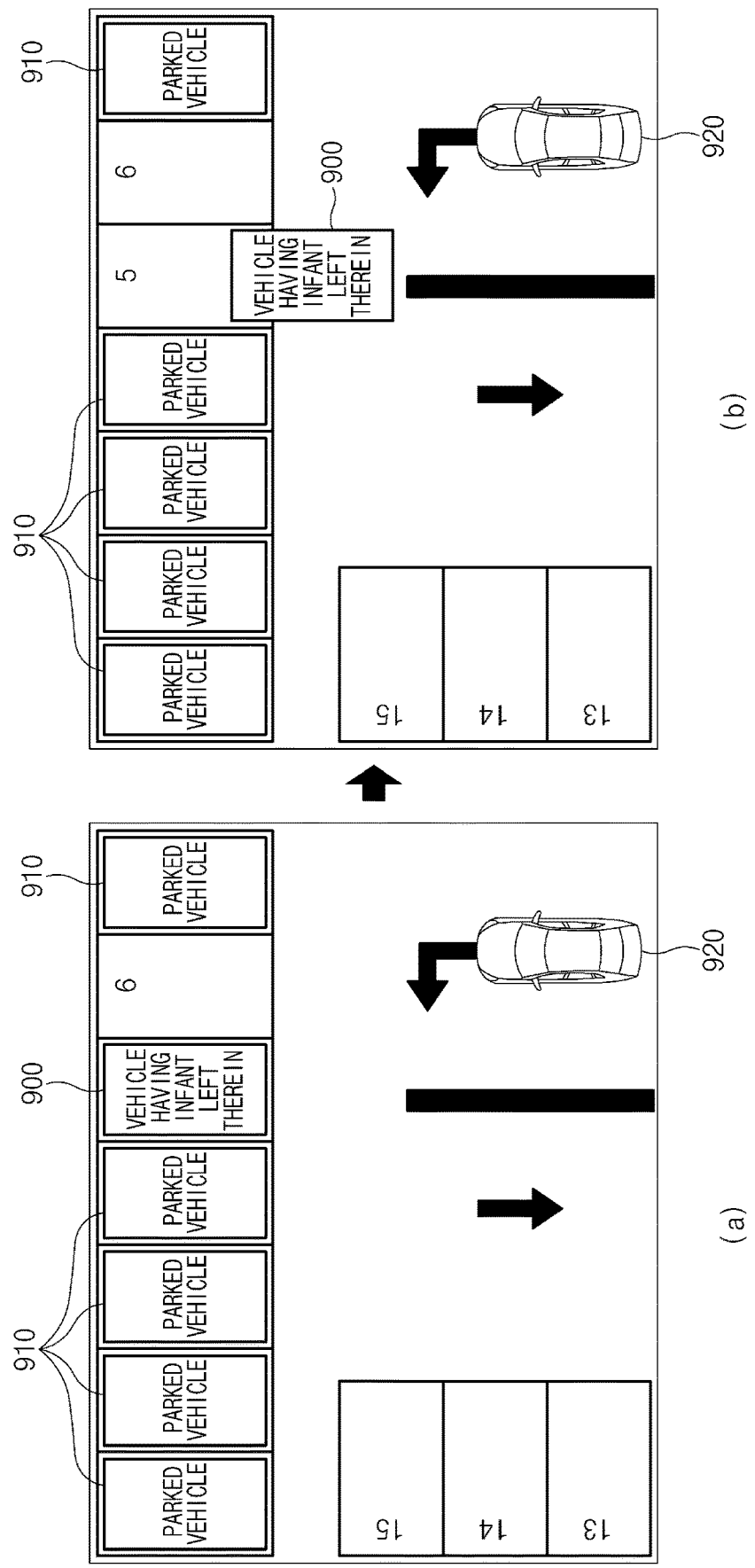
FIG. 9 is a view illustrating an example of a second step measure.

FIG. 3 is a flowchart illustrating a method for protecting a person left in the vehicle according to an embodiment of the present disclosure. FIG. 4 is a detailed flowchart illustrating step S170 illustrated in FIG. 3. FIG. 5 is a view illustrating an operation of the radar sensor illustrated in FIG. 1. FIG. 6 is a view illustrating an example of distinguishing between an adult and an infant. FIG. 7 is a view illustrating another example of distinguishing between an adult and an infant. FIG. 8 is a table illustrating an example of a first step measure. FIG. 9 is a view illustrating an example of a second step measure.

Referring to FIG. 3, during traveling of the vehicle 10, the controller 100 may activate the radar sensor 50 and may obtain reflected-wave information (S100).

Referring to FIG. 5, the radar sensor 50 may be installed in a roof panel disposed above a rear seat 700. The radar sensor 50 may radiate electromagnetic waves TR having a specific wavelength toward the rear seat 700, may receive reflected waves RF reflected from an object located on the rear seat 700, and may generate reflected-wave information. The reflected-wave information may include a frequency change depending on displacement and may include a change in the intensity of the reflected waves over time. The intensity of the reflected waves may represent the distance from the object, and the unit thereof may be decibel (dB). However, the scope of the present disclosure is not limited thereto.

When a baby is sitting on a car seat 800 mounted on the rear seat 700 as illustrated in FIG. 5, or when a person is directly sitting on the rear seat 700, the radar sensor 50 may radiate electromagnetic waves TR toward the rear seat 700, may receive reflected waves RF reflected from the baby or the person, and may generate reflected-wave information.

During traveling of the vehicle 10, the controller 100 may calculate the average respiration per minute of the person located on the rear seat 700 from the waveform of the reflected waves included in the reflected-wave information. Specifically, the controller 100 may extract peak points of the reflected-wave intensity for one minute and may calculate the number of times that the peak points are detected. Further, the controller 100 may calculate the average of the number of times that peak points are detected for a specific period of time (e.g., ten minutes) and may obtain and store the average respiration per minute of the person located on the rear seat 700.

In addition, during traveling of the vehicle 10, the controller 100 may calculate the absolute height and the width for respiration of the person located on the rear seat 700 from the waveform of the reflected waves. Specifically, the controller 100 may calculate the average of peak points for a specific period of time (e.g., ten minutes) and may obtain and store the absolute height for respiration of the person located on the rear seat 700. The controller 100 may calculate the average of differences between peaks and troughs for a specific period of time and may obtain and store the width for respiration of the person located on the rear seat 700.

Referring again to FIG. 3, the controller 100 may activate the radar sensor 50 and may determine whether there is a person on a rear seat, based on the waveform of reflected waves immediately after the ignition of the vehicle 10 is turned off (S110) or within a predetermined period of time (e.g., 30 seconds). For example, when a periodic waveform with relatively uniform amplitude is detected for a specific period of time (e.g., 30 seconds), the controller 100 may determine that there is a person on the rear seat.

When it is determined that there is a person on the rear seat, the controller 100 may determine whether the person located on the rear seat is an adult or an infant, based on the previously stored average respiration per minute of the person located on the rear seat or the previously stored absolute height and width of the respiration pattern detected from the person located on the rear seat (S120).

Referring to FIG. 6, an example of distinguishing between an adult and an infant is illustrated. As illustrated in FIG. 6, the average respiration per minute of an adult ranges 12 to 20, and the average respiration per minute of an infant ranges 18 to 41.9.

Accordingly, when the previously stored average respiration per minute of the person located on the rear seat is greater than or equal to a specific number of times (e.g., 18 times), the controller 100 may determine that the person on the rear seat is an infant. In contrast, when the previously stored average respiration per minute of the person located on the rear seat is less than the specific number of times (e.g., 18 times), the controller 100 may determine that the person on the rear seat is an adult.

Referring to FIG. 7, another example of distinguishing between an adult and an infant is illustrated. As illustrated in FIG. 7, the average absolute height H1 and the average width W1 for respiration of an infant that are illustrated in (a) of FIG. 7 are smaller than the average absolute height H2 and the average width W2 for respiration of an adult that are illustrated in (b) of FIG. 7. This is because the chest of the adult is closer to the radar sensor 50 than the chest of the infant and the adult has a larger change in the chest than the infant. For example, H1 and H2 may be 60 dB and 160 dB, respectively, and W1 and W2 may be 13 dB and 45 dB, respectively. However, the scope of the present disclosure is not limited thereto.

Accordingly, the controller 100 may determine that the person on the rear seat is an infant, when the previously stored absolute height and width for respiration of the person located on the rear seat are closer to the average absolute height H1 and the average width W1 for respiration of an infant than to the average absolute height H2 and the average width W2 for respiration of an adult. In contrast, the controller 100 may determine that the person on the rear seat is an adult, when the previously stored absolute height and width for respiration of the person located on the rear seat are not closer to the average absolute height H1 and the average width W1 for respiration of an infant than to the average absolute height H2 and the average width W2 for respiration of an adult.

Although the conditions by which the person on the rear seat is determined to be an infant are illustrated in FIGS. 6 and 7, respectively, the controller 100 may finally determine that the person on the rear seat is an infant, when both the condition in FIG. 6 and the condition in FIG. 7 are satisfied. Alternatively, the controller 100 may finally determine that the person on the rear seat is an infant, when at least one of the condition in FIG. 6 and the condition in FIG. 7 is satisfied.

Referring again to FIG. 3, when the person on the rear seat is not an infant (No in S120), the controller 100 may execute basic radar passenger detection notification, and the method for protecting a person left in a vehicle may be ended. The basic radar passenger detection notification may be a measure for informing a driver or a passerby that the person (e.g., an adult, a pet, or the like—as provided herein, the term "person" also refers to any living being such as a pet) that is not an infant exists in the vehicle 10. Examples of the basic radar passenger detection notification may include operation of a klaxon (horn), lamp on/off, SMS and App notification to a user terminal registered in advance, and the like. However, the scope of the present disclosure is not limited thereto.

When the person on the rear seat is an infant (Yes in S120), the controller 100 may generate a warning to inform the fact that the infant exists in the vehicle 10 (S130). According to an embodiment, the controller 100 may control the klaxon (horn) to produce a sound in a preset pattern and size. According to an embodiment, the controller 100 may control the TMS 200 to transmit emergency situation notification to the telematics center to inform the fact that the infant exists in the vehicle 10, and the telematics center, which receives the emergency situation notification, may send SMS and App notification including the corresponding fact to the user terminal registered in advance. Here, SMS may refer to a text message, and App notification may refer to push notification transferred through an application installed in the terminal. According to an embodiment, the controller 100 may output the warning for informing the fact that the infant exists in the vehicle 10, through a display device such as an audio, video, and navigation (AVN), a window screen, a spot lamp, or the like. According to an embodiment, the controller 100 may turn on and off lamps (e.g., headlamps, hazard lights, fog lamps, and the like) in a preset pattern and brightness to inform the fact that the infant exists in the vehicle 10.

The controller 100 may determine whether the driver recognizes the warning and makes an attempt to rescue the infant from the vehicle 10. To this end, in the embodiment of FIG. 3, the controller 100 may determine whether a door of the vehicle 10 is open (S140). The determination method is merely an embodiment for determining whether the driver makes an attempt to rescue the infant from the vehicle 10, and the scope of the present disclosure is not limited thereto.

When it is detected that the door of the vehicle 10 is opened within a predetermined period of time (e.g., one to five minutes) (Yes in S140), the method for protecting a person left in the vehicle 10 may be ended because it is clear that the driver makes an attempt to rescue the infant from the vehicle 10.

When it is not detected that the door of the vehicle 10 is opened within the predetermined period of time (e.g., one to five minutes) (No in S140), the controller 100 may determine a risk level that is classified as safety or danger, where the "danger" risk level indicates possible danger (e.g., serious injury or death) to a person trapped inside the vehicle if a current situation persists.

Steps S150, S160, and S170 may be sequentially performed when it is not detected that the door of the vehicle 10 is opened within the predetermined period of time (e.g., one to five minutes). However, the controller 100 may consistently monitor whether the door of the vehicle 10 is opened. When it is detected that the door of the vehicle 10 is opened during the performance of step S150, S160, or S170, the controller 100 may immediately stop the current operation without threatening the safety of the infant and may not perform the subsequent operations.

The predetermined period of time (e.g., one to five minutes) may be set to specific time in advance, and the controller 100 may adjust the preset specific time with reference to $CO_2$ information of the $CO_2$ sensor 60, temperature information of the temperature sensor 70, or weather information collected through the TMS 200. The aim is to advance the time to take follow-up measures by reducing the predetermined period of time, in the case where the current indoor environment may threaten the survival of the infant (e.g., when the amount of sunshine exceeds a critical amount of sunshine or the current temperature is greater than or equal to a critical temperature).

According to an embodiment, the controller 100 may determine the risk level, based on at least one of the elapsed time after the ignition is turned off, the current respiration per minute of the infant, and the indoor temperature.

For example, the controller 100 may determine the current risk level to be "danger", when the current respiration per minute of the infant that is measured based on the waveform of reflected waves received by the radar sensor 50 is 18 or less, or the indoor temperature measured by the temperature sensor 70 is 37 degrees Celsius or more, under the condition that the elapsed time after the ignition is turned off exceeds predetermined time (e.g., ten minutes). In contrast, the controller 100 may determine the current risk level to be "safety", when the elapsed time after the ignition is turned off does not exceed the predetermined time (e.g., ten minutes), or when the elapsed time after the ignition is turned off exceeds the predetermined time (e.g., ten minutes), but the current respiration per minute of the infant that is measured based on the waveform of reflected waves received by the radar sensor 50 is 18 or more and the indoor temperature measured by the temperature sensor 70 is less than 37 degrees Celsius.

According to another embodiment, the condition for determination of the risk level may be modified without any specific limitation, and the controller 100 may allow a user to set the risk level sensitivity in a stepwise manner depending on characteristics of the vehicle 10, the age of the infant, and the like, thereby preventing unnecessary malfunctions.

When the risk level corresponds to "safety" (No in S160), step S140 may be performed again.

When the risk level corresponds to "danger" (Yes in S160), the controller 100 may take follow-up measures for the safety of the infant.

Referring to FIG. 4, step S170 is illustrated in greater detail.

The controller 100 may take a first step measure (S172). The first step measure may be an operation of controlling the air-conditioning controller 400 and/or the power window 500.

Prior to the first step measure, the controller 100 may collect information using the various sensors and may determine what risk factors are present. The controller 100 may take first step measures appropriate for the respective risk factors. To this end, the controller 100 may store, in advance, critical values (e.g., a critical amount of sunshine, a critical temperature, a critical indoor temperature, a critical humidity, a critical $CO_2$ concentration, and the like) on the basis of which the risk factors are determined, and the controller 100 may determine the risk factors by comparing currently measured values and the critical values.

The first step measure is aimed at actively maintaining an indoor environment that does not interfere with the survival of the infant, such as maintaining appropriate indoor temperature.

Hereinafter, an example of taking countermeasures for respective risk factors will be described with reference to FIG. 8.

The controller 100 may collect weather information (e.g., excessive sunlight, sultriness, cold, or the like) from the telematics center through the TMS 200. The controller 100 may determine whether the current weather threatens the survival of the infant, based on the weather information. When it is determined that the current weather threatens the survival of the infant (e.g., when the amount of sunshine exceeds a critical amount of sunshine or the current temperature is greater than or equal to a critical temperature), the controller 100 may control the air-conditioning controller 400 to operate the air conditioner at a specific intensity and temperature and appropriately maintain the indoor temperature and may control the power window 500 to close all the windows such that the indoor temperature is appropriately maintained.

The controller 100 may collect the indoor temperature by using the temperature sensor 70. Based on the indoor temperature, the controller 100 may determine whether the current temperature is increased to a temperature that threatens the survival of the infant. When it is determined that the current temperature is increased to the temperature that threatens the survival of the infant (e.g., when the indoor temperature is greater than or equal to a critical indoor temperature), the controller 100 may control the air-conditioning controller 400 to operate the air conditioner at a specific intensity and temperature and appropriately maintain the indoor temperature and may control the power window 500 to close all the windows such that the indoor temperature is appropriately maintained.

The controller 100 may collect the concentration of carbon dioxide contained in indoor air, by using the $CO_2$ sensor 60. The controller 100 may determine whether the current $CO_2$ concentration is increased to a concentration that threatens the survival of the infant. When it is determined that the current $CO_2$ concentration is increased to the concentration that threatens the survival of the infant (e.g., when the current $CO_2$ concentration is greater than or equal to a critical $CO_2$ concentration), the controller 100 may control the air-conditioning controller 400 to operate the air conditioner in an outdoor air circulation state and ventilate the vehicle 10.

The controller 100 may collect the humidity of indoor air through the humidity sensor (not illustrated). The controller 100 may determine whether the current humidity is increased or decreased to a humidity that threatens the survival of the infant. When it is determined that the current humidity is increased or decreased to the humidity that threatens the survival of the infant (e.g., when the current humidity is 80% or more, or 20% or less), the controller 100 may control the air-conditioning controller 400 to operate the air conditioner in an outdoor air circulation state to ventilate the vehicle 10 or to operate the air conditioner or a heater to adjust the indoor temperature and raise or lower the humidity.

Referring again to FIG. 4, during the first step measure, the controller 100 may determine whether a condition for a step shift is satisfied (S174).

According to an embodiment, the step shift condition may be determined based on at least one of the battery level of the vehicle 10, the respiration rate of the infant, and the elapsed time after the ignition is turned off.

For example, the controller 100 may determine that the step shift condition is satisfied, when it is not detected that the door of the vehicle 10 is opened for more than a specific period of time (e.g., ten minutes, the specific period of time being varied depending on regulations or local or national circumstances), when it is difficult to continue to operate the air-conditioning controller 400 due to the lack of vehicle fuel or low battery, and/or when the respiration per minute of the infant is decreased to 10 or less.

When the step shift condition is not satisfied (No in S174), the first step measure may continue, and the controller 100 may periodically determine whether the step shift condition is satisfied.

When the step shift condition is satisfied (Yes in S174), the controller 100 may take a second step measure (S176), and the second step measure may be an operation of moving the position of the vehicle 10 to enable other people to recognize the dangerous situation of the vehicle 10.

Referring to FIG. 9, it is assumed that a vehicle 900 in which an infant is left is parked in a parking lot together with a plurality of parked vehicles 910 as illustrated in (a) of FIG. 9. The controller 100 of the vehicle 900 in which the infant is left may take a second step measure to move the vehicle 900 toward an obstacle ahead to obstruct the path of a proceeding vehicle 920 as illustrated in (b) of FIG. 9, and the driver of the proceeding vehicle 920 may recognize a dangerous situation of the vehicle 900 in which the infant is left and may take a necessary measure.

A specific operation relevant thereto will be described. The controller 100 of the vehicle 900 in which the infant is left may determine whether the vehicle 900 is located in the parking lot. According to an embodiment, the controller 100 may determine whether the vehicle 900 is located in the parking lot, based on recognition of a parking line based on a surround view image of the SVM 80. According to an embodiment, the controller 100 may determine whether the vehicle 900 is located in the parking lot, based on the current position according to position information of the GPS 600 and high-definition map information of the AVN (not illustrated). Even though the vehicle 900 is determined not to be in the parking lot based on the current position and the high-definition map information, the controller 100 may determine that the vehicle 900 is located in the parking lot, when the vehicle 900 is determined to be in a garage of a house or a parking lot ahead of the house.

When the vehicle 900 is determined to be located in the parking lot, the controller 100 may control the ECU 300 to move the vehicle 900 to a road on which another vehicle passes. When the road is located ahead as illustrated in FIG. 9, the controller 100 may move the vehicle 900 by a predetermined distance to impede a movement of the proceeding vehicle 920. However, when a parked vehicle is determined to be ahead of or behind the vehicle 900 based on an image obtained through a front or rear camera (that is, the vehicle 900 is in a parallel parking area), the controller 100 may move the vehicle 900 by a predetermined length (e.g., the whole length) in the opposite direction to the parking direction, or may move the vehicle 900 by a predetermined distance toward the road, to impede the movement of the other vehicle. However, when the infant is likely to be placed in a more dangerous situation due to the movement of the vehicle 900, for example, when the vehicle 900 is located adjacent to an expressway or a highway, the controller 100 may not move the vehicle 900 in which the infant is left.

When moving the vehicle 900, the controller 100 may move the vehicle 900 at a predetermined speed (5 km/h) or less for the safety of the infant. The controller 100 may move the vehicle 900 while preventing a collision of the vehicle 900 with surrounding obstacles by using the ADS 90.

The controller 100 may generate notification for informing people around the vehicle 900 of the dangerous situation after moving the vehicle 900 to an appropriate position. The notification may refer to an operation of producing a sound using the klaxon (horn) and/or turning on/off lamps (e.g., headlamps, hazard lights, fog lamps, and the like) in a preset pattern and brightness.

According to an embodiment, the controller 100 may display text informing of the dangerous situation on a window of the vehicle 900 by using an OLED display, a projection display, or the like, thereby more effectively informing people around the vehicle 900 of the dangerous situation.

According to an embodiment, to inform of the dangerous situation, the controller 100 may turn on all lights in the vehicle 900 and may display a wanting screen informing of the dangerous situation on the AVN (not illustrated).

In addition, after moving the vehicle 900 to an appropriate position, the controller 100 may unlock doors of the vehicle 900 to help people around the vehicle 900 rescue the infant.

In the case where it is difficult to inform people around the vehicle 900 of the dangerous situation by impeding a traffic flow, the controller 100 may move the vehicle 900 to a close place (e.g., a fire station, a medical institution, a police station, a gas station, or the like) based on a high-definition map and position information of the GPS 600 by using an autonomous driving function of the vehicle 900. At this time, for safe travel of the vehicle 900, the controller 100 may perform control such that an operation of producing a sound using the klaxon (horn) and/or turning on/off the hazard lights is performed in parallel with the movement of the vehicle 900.

Together with the execution of the first step measure and the second step measure, the controller 100 may transmit emergency situation notification or a request for help that includes vehicle information (the current position, the battery level, indoor conditions of the vehicle, the current follow-up measure step, and the like) and state information of the occupant (the presence or absence of the infant, the respiration state of the infant, and the like), to the telematics center through the TMS 200 for the purpose of a rapid rescue of the infant. The telematics center may transfer the state of the vehicle 900 and the request for help to an emergency rescue center (e.g., 119), based on the emergency situation notification or the request for help.

The vehicle and the method for protecting a person left in a vehicle according to the embodiments of the present disclosure, when an infant is left in the vehicle, may not only inform of the dangerous situation to the outside, but may also minimize a risk of death of the infant by detecting internal/external states of the vehicle and a state of the infant and maintaining comfort in the indoor environment of the vehicle.

The operations of the method or the algorithm described in connection with the embodiments disclosed herein may be embodied directly in hardware or a software module executed by a processor, or in a combination thereof. The software module may reside on a storage medium (that is, a memory and/or storage) such as a RAM, a flash memory, a ROM, an EPROM, an EEPROM, a register, a hard disk, a removable disk, or a CD-ROM. The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

According to the embodiments of the present disclosure, the vehicle and the method for protecting a person left in the vehicle, when the person is an infant, may not only inform of the dangerous situation to the outside, but may also minimize a risk of death of the infant by detecting internal/ external states of the vehicle and a state of the infant and maintaining comfort in the indoor environment of the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A method for protecting a person left in a vehicle, the method comprising:
    determining whether the person is present on a rear seat, by using a waveform of a reflected wave generated by a radar sensor after an ignition of the vehicle is turned off;
    determining a risk level, when it is determined that the person is on the rear seat;
    taking a first step measure that corresponds to a risk factor, when the risk level indicates a possibility of danger to the person;
    determining that a step shift condition is satisfied, when at least one of an air-conditioning controller is not operated or a door is not opened; and
    controlling an operation of moving the vehicle to a road on which another vehicle travels, by using an electronic control unit (ECU) and an automated driving system (ADS) when the step shift condition is satisfied.

2. The method of claim 1, further comprising:
    determining whether the person on the rear seat is an infant, when it is determined that the person is on the rear seat,
    wherein determining whether the person on the rear seat is the infant includes:
    determining whether an average respiration per minute of the person on the rear seat that is calculated from the waveform of the reflected wave is greater than or equal to a specific number of times.

3. The method of claim 1, further comprising:
    determining whether the person on the rear seat is an infant, when it is determined that the person is on the rear seat,
    wherein determining whether the person on the rear seat is the infant includes:
    determining whether an absolute height and a width of a respiration pattern of the person on the rear seat that are calculated from the waveform of the reflected wave are approximately equal to an average absolute height and an average width of a respiration pattern of the infant.

4. The method of claim 1, further comprising:
    calculating and storing, in advance, an average respiration per minute of the person on the rear seat and an absolute height and a width of a respiration pattern of the person on the rear seat during traveling of the vehicle.

5. The method of claim 1, wherein the radar sensor is installed in a roof panel of the rear seat.

6. The method of claim 1, further comprising:
    prior to determining the risk level, generating a warning for informing that an infant is in the vehicle, when a person on the rear seat is determined to be the infant,
    wherein the warning includes at least one of operation of lamps, displaying the warning on a cluster or an audio, video, and navigation (AVN), producing a sound by using a klaxon, and transmitting a notification to a telematics center.

7. The method of claim 6, further comprising:
    determining whether a door of the vehicle is open, after generating the warning,
    wherein a subsequent operation is not performed, when it is detected that the door of the vehicle is open.

8. The method of claim 1, wherein the risk level is determined based on at least one of an elapsed time after the ignition is turned off, a current respiration per minute of the person who is an infant, and an indoor temperature.

9. The method of claim 1, wherein the first step measure is an operation of controlling at least one of an air-conditioning controller and a power window.

10. The method of claim 1, wherein taking the first step measure includes:
    collecting weather information of a telematics center;
    determining whether current weather threatens survival of the person who is an infant, based on the weather information; and
    operating an air conditioner at a specific intensity and temperature and closing a window of the vehicle, when it is determined that the current weather threatens the survival of the infant.

11. The method of claim 1, wherein taking the first step measure includes:
    collecting an indoor temperature by using a temperature sensor;
    determining whether a current temperature is increased so as to threaten survival of the person who is an infant, based on the indoor temperature; and
    operating an air conditioner at a specific intensity and temperature and closing a window of the vehicle, when it is determined that the current temperature is increased to the temperature that threatens the survival of the infant.

12. The method of claim 1, wherein taking the first step measure includes:
    collecting a concentration of carbon dioxide contained in indoor air by using a $CO_2$ sensor;
    determining whether a current carbon dioxide concentration is increased so as to threaten survival of the person who is an infant; and
    operating an air conditioner in an outdoor air circulation state, when it is determined that the current carbon dioxide concentration is increased to the concentration that threatens the survival of the infant.

13. The method of claim 1, wherein taking the first step measure includes:
    collecting a humidity of indoor air by using a humidity sensor;
    determining whether a current humidity is increased or decreased so as to threaten survival of the person who is an infant; and
    operating an air conditioner in an outdoor air circulation state and operating the air conditioner or a heater, when it is determined that the current humidity is increased or decreased to the humidity that threatens the survival of the infant.

14. The method of claim 1, further comprising:
determining whether a step shift condition is satisfied during the first step measure,
wherein the step shift condition is determined based on at least one of a remaining amount of fuel of the vehicle or a remaining amount of a charge of a battery of the vehicle, a respiration rate of an infant, and elapsed time after the ignition is turned off.

15. The method of claim 14, further comprising:
taking a second step measure, when the step shift condition is satisfied.

16. The method of claim 1, further comprising:
generating a notification for informing people around the vehicle of a dangerous situation, after moving the vehicle,
wherein the notification includes at least one of: displaying a warning screen on an audio, video, and navigation (AVN), producing a sound by using a klaxon, and turning on/off lamps including hazard lights.

17. The method of claim 1, further comprising:
unlocking a door of the vehicle, after moving the vehicle.

18. A method for protecting a person left in a vehicle, the method comprising:
determining whether the person present on a rear seat is an infant, by using a waveform of a reflected wave generated by a radar sensor after an ignition of the vehicle is turned off;
determining a risk level, when the person on the rear seat is determined to be the infant;
taking a first step measure corresponding to a risk factor, when the risk level indicates a possibility of danger to the person;
determining whether a step shift condition is satisfied during the first step measure;
determining that a step shift condition is satisfied, when at last one of an air-conditioning controller is not operated or a door is not opened; and
controlling an operation of moving the vehicle to a road on which another vehicle travels by using an electronic control unit (ECU) and an automated driving system (ADS) when the step shift condition is satisfied.

19. A vehicle, comprising:
a radar sensor configured to radiate an electromagnetic wave toward a rear seat and measure a change in intensity of a reflected wave that is reflected from the rear seat; and
a controller configured to determine whether a person present on the rear seat is an infant, by using a waveform of the reflected wave after an ignition of the vehicle is turned off, determine a risk level when the person on the rear seat is determined to be the infant, take a first step measure corresponding to a risk factor when the risk level indicates a possibility of danger to the person, determine that a step shift condition is satisfied, when at least one of an air-conditioning controller is not operated or a door is not opened, and control an operation of moving the vehicle to a road on which another vehicle travels, by using an electronic control unit (ECU) and an automated driving system (ADS) when the step shift condition is satisfied.

* * * * *